United States Patent [19]

Kuramochi

[11] 4,186,627
[45] Feb. 5, 1980

[54] OIL PRESSURE CONTROL MEANS FOR AN AUTOMATIC TRANSMISSION

[75] Inventor: Koujiro Kuramochi, Toyota, Japan

[73] Assignee: Toyota Jidosha Kogyo Kabushiki Kaisha, Japan

[21] Appl. No.: 886,960

[22] Filed: Mar. 15, 1978

[30] Foreign Application Priority Data

Apr. 22, 1977 [JP] Japan .................. 52-47240

[51] Int. Cl.² ............................................ B60K 41/18
[52] U.S. Cl. .................................................... 74/869
[58] Field of Search ................ 74/864, 865, 867, 868, 74/869

[56] References Cited

U.S. PATENT DOCUMENTS

| | | | |
|---|---|---|---|
| 3,167,970 | 2/1965 | Wagner et al. | 74/869 |
| 3,400,613 | 9/1968 | Johnson et al. | 74/869 |
| 3,638,771 | 2/1972 | Chana | 74/869 X |
| 3,656,373 | 4/1972 | Shimosaki | 74/869 |
| 3,731,558 | 5/1973 | Enomoto | 74/867 |
| 3,768,338 | 10/1973 | Bahorich | 74/869 X |
| 4,050,332 | 9/1977 | Taga | 74/869 |

*Primary Examiner*—C. J. Husar
*Assistant Examiner*—Lance W. Chandler
*Attorney, Agent, or Firm*—Stevens, Davis, Miller & Mosher

[57] ABSTRACT

An oil pressure control means for an automatic transmission for vehicles having a plurality of speed shift valves for changing over supply of oil pressure to a plurality of friction engaging means for establishing various speed stages, a manual shift valve for shifting speed ranges and adapted to selectively supply control pressure to the speed shift valves, and a downshift control valve for controlling supply of the downshift control pressure to a particular speed shift valve so that a downshift operation performed by the manual shift valve does not cause abrupt two stage downshifting from the highest speed stage to the next but one lower speed stage, skipping the next lower speed stage.

6 Claims, 4 Drawing Figures

OIL PRESSURE CONTROL MEANS FOR AN AUTOMATIC TRANSMISSION

BACKGROUND OF THE INVENTION

The present invention relates to an oil pressure control means for an automatic transmission for vehicles, and, more particularly, to an improvement thereof with regard to downshift performance.

In an automatic transmission for vehicles comprising a fluid torque converter and a speed shift gear means having a plurality of friction engaging means and adapted to establish various speed shift stages, engagement and disengagement of said friction engaging means are automatically changed over depending upon operating conditions of the vehicle so as to establish the most desirable speed shift stage for the current operating condition of the vehicle, instant by instant. This changing-over control of the friction engaging means is generally effected by an oil pressure control means which comprises a plurality of speed shift valves, adapted to be shifted depending upon a balance of the throttle pressure which varies in accordance with the stepping-on amount of the accelerator pedal or engine throttle opening and the governor pressure which varies in accordance with the vehicle speed, thereby selecting the most desirable speed shift stage of the speed shift gear means. Furthermore, the oil pressure control means includes a manual shift valve adapted to be operated by hand by the driver for setting a particular speed shift range. The speed shift ranges in usual automatic transmissions include D range, 2 range, and L range for forward driving. Assuming that an automatic transmission is designed to provide a 1st speed stage, a 2nd speed stage, a 3rd speed stage and an overdrive stage, which are automatically selected in accordance with a balance of the vehicle speed and the stepping-on amount of the accelerator pedal, when the manual shift valve is shifted to the D range, an automatic selection of speed stage is made out of the aforementioned four speed stages. When the manual shift valve is shifted to the 2 range, speed stage selection is made from the 1st speed stage and the 2nd speed stage. When the manual shift valve is shifted to the L range, the automatic transmission is fixed in the 1st speed stage.

Now, let us assume that an automatic transmission includes overdrive means and a vehicle having such an automatic transmission is being driven in overdrive stage. Under this running condition, if the manual shift valve is abruptly shifted from D range to 2 range, the automatic transmission is abruptly shifted down by two stages from the overdrive stage to the 2nd speed stage, skipping over the 3rd speed stage. Such an abrupt two-stage downshifting is not desirable because it causes heavy frictional force to be exerted on the friction engaging elements of the friction engaging means, thereby unduly wearing these elements, while it further produces a danger of causing an over-revving of the engine. Furthermore, such an abrupt two-stage downshifting causes abrupt deceleration of the vehicle, which is not desirable in view of driving safety.

SUMMARY OF THE INVENTION

It is therefore the object of the present invention to provide an improved oil pressure control means for automatic transmissions incorporating overdrive means, said oil pressure control means being adapted not to abruptly shift down the transmission from the overdrive stage to the 2nd speed stage when the manual shift valve is shifted from D range to 2 range when the vehicle is running in the overdrive stage, but to shift down once the transmission from the overdrive stage to the 3rd speed stage so as to cause a moderate deceleration of the vehicle in the 3rd speed stage and thereafter as a second operation to shift down the transmission from the 3rd speed stage to the 2nd speed stage.

BRIEF DESCRIPTION OF THE DRAWING

The present invention will become more fully understood from the detailed description given herein below and the accompanying drawings which are given by way of illustration only and thus are not limitative of the present invention, and wherein.

DESCRIPTION OF THE PREFERRED EMBODIMENT

Figure 1:
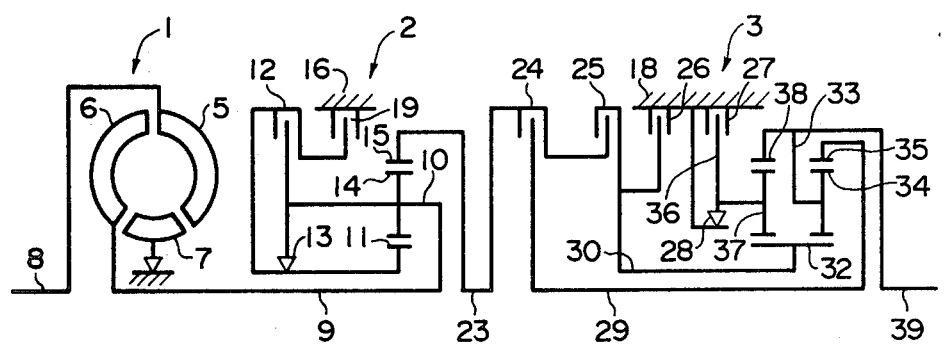
FIG. 1 is a diagrammatical view showing an example of an automatic transmission incorporating an overdrive means.

In FIG. 1 an example of an automatic transmission incorporating an overdrive means is shown in the form of a diagram for the purpose of simplicity. However, if the more concrete structure of the transmission is required, reference should be made to the specifications and drawings of co-pending patent applications Ser. Nos. 791,575 and 791,576, both being assigned to the same assignee as the present application. The automatic transmission herein shown comprises a fluid torque converter 1, an overdrive means 2, a reduction gear means 3 for effecting three forward speed stages and one rearward speed stage and is adapted to be controlled by the oil pressure control means shown in FIG. 2. The fluid torque converter 1 is of the conventional well-known type including a pump impeller 5, a turbine 6, and a stator 7. The pump impeller 5 is connected with the crankshaft 8 of the engine (not shown) while the turbine 6 is connected with a turbine shaft 9 which forms an output shaft of the fluid torque converter. This output shaft also provides an input shaft of the overdrive means 2, wherein the input shaft is connected with a carrier 10 of a planetary gear mechanism incorporated in the overdrive means. The carrier 10 rotatably supports a plurality of planetary pinions 14 which in turn are engaged with a sun gear 11 and a ring gear 15. A multi-disc clutch 12 and a one-way clutch 13 are provided between the sun gear 11 and the carrier 10, and, furthermore, a multi-disc brake 19 is provided between the sun gear 11 and the overdrive housing or case 16 enclosing the overdrive means or the planetary gear mechanism.

The ring gear 15 of the overdrive means 2 is connected with an input shaft 23 of the reduction gear means 3. A multi-disc clutch 24 is provided between the input shaft 23 and intermediate shaft 29 while a multi-disc clutch 25 is provided between the input shaft 23 and a sun gear shaft 30. A multi-disc brake 26 is provided between the sun gear shaft 30 and the transmission case 18. The sun gear shaft 30 has a sun gear 32 integrally formed therein, said sun gear meshing with a plurality of first planetary pinions 34 which mesh in turn with a ring gear 35 supported by a carrier 33 thereby forming a first set of planetary gear mechanism while the sun gear 32 also meshes with a plurality of second planetary pinions 37 which mesh in turn with a ring gear 38 supported by a carrier 36, thereby forming a second set of planetary gear mechanism. The ring gear 35 of said first planetary gear mechanism is connected with the intermediate shaft 29, while the carrier 33 thereof is connected with the ring gear 38 of said second planetary gear mechanism. The combination of the carrier 33 and the ring gear 38 is connected with an output shaft 39. A multi-disc brake 27 and a one-way clutch 28 are provided between the carrier 36 of said second planetary gear mechanism and the transmission case 18.

The automatic transmission is controlled by the oil pressure control means explained hereinunder in a manner such that the aforementioned clutches and brakes are engaged or disengaged in order to accomplish various shift conditions among four forward speed stages including an overdrive stage and one rearward drive stage in accordance with the operation of a manual shift lever (not shown) and/or the balance of the engine output power and the vehicle speed.

Table 1 shows the operating conditions of the clutches and brakes in various shift conditions.

Figure 2:
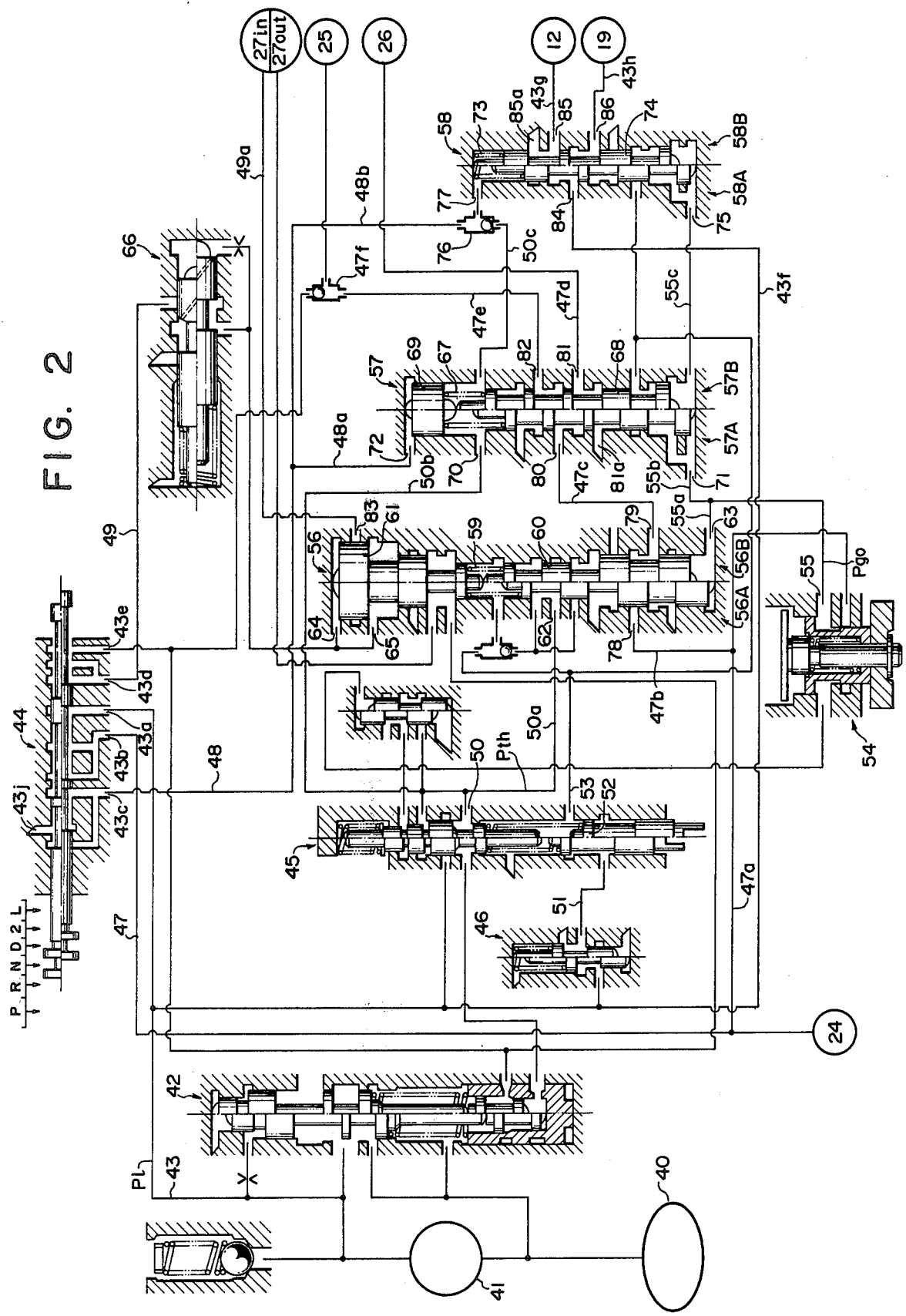
FIG. 2 is a diagram showing a basic oil pressure control circuit of an oil pressure control means for the automatic transmission shown in FIG. 1.

FIG. 2 is a diagram showing an example of the standard constitution of the oil pressure control circuit included in the oil pressure control means 4. The oil pumped up from the oil reservoir 40 by an oil pump 41 is delivered to a line pressure regulating valve 42 and generates a line pressure Pl having a predetermined regulated value in an oil passage 43. The line pressure is supplied to a manual shift valve 44, a throttle pressure regulating valve 45, and a detent pressure regulating valve 46. The manual shift valve 44 has various shift positions such as parking (P), reverse (R), neutral (N), D range (D), 2 range (2), and L range (L), and is adapted to deliver the line pressure supplied to its input port 43a to its output ports 43b, 43c, 43d and 43e in accordance with the shift position thereof as shown in Table 2.

The throttle pressure regulating valve 45 generates a throttle pressure Pth at its output port 50 in accordance with the amount of depression of the accelerator pedal or the opening of the intake throttle valve. The detent pressure regulating valve 46 generates a detent pressure at its output passage 51, said detent pressure being lower than the line pressure by a predetermined value and being supplied to speed shift valves for maintaining them at particular shift positions as explained hereinunder through a valve 52 incorporated in the throttle pressure regulating valve and adapted to establish communication therethrough when the accelerator pedal has been stepped on beyond a predetermined amount and through an oil pressure 53. A pasage 47 connected to the port 43b of the manual shift valve 44 is led to the clutch 24 (forward clutch), and a passage 47a branched from a middle portion thereof is led to a governor valve 54. The governor valve generates a governor pressure Pgo corresponding to the vehicle speed at its output port 55.

TABLE 1

Clutch/Brake Operation of the Conventional Control Means

| SHIFT POSITION | | 12 | 13 | 19 | 24 | 25 | 26 | 27 | 28 |
|---|---|---|---|---|---|---|---|---|---|
| Forward | D | 1st Speed | O | * | X | O | X | X | X | * |
| | Range | 2nd Speed | O | * | X | O | X | O | X | X |
| | | 3rd Speed | O | * | X | O | O | X | X | X |
| | | 4th Speed (O/D) | X | X | O | O | O | X | X | X |
| | 2 | 1st Speed | O | * | X | O | X | X | X | * |
| | Range | 2nd Speed | O | * | X | O | X | O | X | X |
| | L Range | 1st Speed | O | * | X | O | X | X | O | * |
| REVERSE (R. RANGE) | | O | * | X | X | O | X | O | X |

Wherein O shows that the clutch or brake is engaged; * shows that the clutch or brake is engaged in the engine drive condition while it is disengaged in the engine brake condition; and X shows that the clutch or brake is disengaged. O/D means the overdrive speed stage. In D range, the transmission may operate in the 1st, 2nd, 3rd and 4th (O/D) speed stages. In 2 range, the transmission may operate in the 1st and 2nd speed stages. In L range, the transmission is fixed in the 1st speed stage.

TABLE 2

| | Shift Position | | | | | |
|---|---|---|---|---|---|---|
| Port | P | R | N | D | 2 | L |
| 43b | | | | 0 | 0 | 0 |
| 43c | | | | | 0 | 0 |
| 43d | 0 | 0 | | | | 0 |
| 43e | | 0 | | | | |

The valves designated by 56 and 57 are a 1-2 speed shift valve and a 2-3 speed shift valve, respectively. 58 designates an overdrive control valve. The 1-2 speed shift valve 56 comprises two valve elements 60 and 61 axially opposed to each other with interposition of a compression coil spring 59. The valve element 60 is shifted between the lower shift position shown by 56A and the upper shift position shown by 56B due to the balance of the sum of the force applied by the spring 59 and the downward force (as seen in the figure) applied by the throttle pressure Pth supplied to a port 62 through a passage 50a and the upward force (as seen in the figure) applied by the governor pressure Pgo supplied to a port 63 through a passage 55a. Ports 64 and 65 of the 1-2 speed shift valve 56 are supplied with the line pressure which appears at the output 43d of the manual shift valve 44 when it is shifted to L range through a passage 49 and a low modulator valve 66 under the regulation applied thereby so that, when the pressure is supplied to these ports, the valve element 61 is shifted downward in the figure and compulsorily maintains the valve element 60 at its lower shift position 56A.

Similarly, the 2-3 speed shift valve 57 comprises two valve elements 68 and 69 axially opposed to each other with interposition of a compression coil spring 67. The valve element 68 is also shifted between the lower shift position designated by 57A and the upper shift position designated by 57B due to the balance of the sum of the downward force applied by the spring 67 and the downward force applied by the throttle pressure Pth supplied to a port 70 through a passage 50b and the upward force applied by the governor pressure Pgo supplied to a port 71 through a passage 55b. A port 72 is supplied with the line pressure which appears at the output port 43c of the manual shift valve 44 when it is shifted to 2 range through passages 48 and 48a so that when the pressure is supplied to the port 72, the valve element is shifted downward and compulsorily maintains the valve element 68 at the lower shift position shown by 57A.

The overdrive control valve 58 comprises a valve element 74 urged downward in the figure by a compression coil spring 73. The valve element 74 is exposed to a governor pressure Pgo at its lower end, said governor pressure being supplied at a port 75 through a passage 55c. In addition to the downward force applied by the spring 73, the valve element 74 is selectively supplied by either the throttle pressure Pth or the line pressure which appears in the output port 43c of the manual shift valve 44 when it is shifted to 2 range, said throttle pressure being supplied through a passage 50c, a shuttle valve 76 and a port 77 while the line pressure is supplied through a passage 48b, the shuttle valve 76 and a port 77. According to the balance of the sum of the spring force and the force applied by the throttle pressure or the line pressure and the upward force applied by the governor pressure, the valve element 74 is shifted between the lower shift position designated by 58A and the upper shift position designated by 58B.

The port 78 of the 1-2 speed shift valve 56 is supplied with the line pressure through a passage 47b when the manual shift valve is shifted to D range. If the 1-2 speed shift valve is in its upward shift position shown by 56B, the line pressure supplied to the port 78 is transmitted to the port 79, wherefrom the pressure is conducted through a passage 47c to a port 80 of the 2-3 speed shift valve 57. When the 2-3 speed shift valve is in its downward shift position as shown by 57A, the line pressure is transmitted from the port 80 to a port 81, wherefrom the pressure is conducted through a passage 47d to the brake 26 (second brake). When the 2-3 speed shift valve is in the upward speed shift position, the oil pressure supplied to the port 80 is transmitted to a port 82, wherefrom the pressure is conducted through a passage 47e and a shuttle valve 47f to the clutch 25 (direct clutch). When the manual shift valve 44 is shifted to L range, the oil pressure appearing at the output port 43d is conducted through the low modulator valve 66, the ports 64 and 83 of the 1-2 speed shift valve 56 and a passage 49a to the inside of the brake 27 (first brake). The outside of the brake 27 is supplied with the oil pressure which appears in the output port 43e of the manual shift valve 44 when it is shifted to R position.

The port 84 of the overdrive control valve 58 is supplied with the line pressure through the passages 43 and 43f. When the overdrive control valve is in the lower shift position such as shown by 58A, the line pressure supplied to the port 84 is transmitted to a port 85, wherefrom the pressure is conducted through a passage 43g to the clutch 12 of the overdrive means. On the contrary, if the overdrive control valve is in the upper shift position such as shown by 58B, the pressure is transmitted from the port 84 to a port 86, wherefrom the pressure is conducted through a passage 43h to the brake 19 of the overdrive means.

The operation of an oil pressure control circuit such as shown in FIG. 2 is conventionally well known in the art. However, for the sake of convenience, the operation will be summarized in the following:

D range

When the manual shift valve 44 is shifted to D range, the line pressure appears in the passage 47 and the pressure is supplied directly to the clutch 24. Under this condition, if the vehicle is standing or is running at a low speed, the governor pressure Pgo generated by the governor valve 54 is so low that the -2 speed shift valve 56, the 2-3 speed shift valve 57 and the overdrive control valve 58 are maintained in the lower shift positions such as designated by 56A, 57A and 58A, respectively, whereby the oil pressure supplied through the passage 47b is intercepted at the port 78 and is not transmitted to the subsequent passages including the direct clutch 25 and the second brake 26. The oil pressure conducted through the passage 43f to the overdrive control valve 58 is supplied to the clutch 12 of the overdrive means. In this condition, therefore, the overdrive mechanism is locked, and the reduction gear means is in the 1st speed stage.

Starting from this condition, when the vehicle speed gradually increases, the governor pressure Pgo gradually increases and, at a certain vehicle speed, the 1-2 speed shift valve 56 is shifted to the 56B position, whereby the line pressure is supplied to the port 79, wherefrom the pressure is conducted through the ports 80 and 81 of the 2-3 speed shift valve 57 and the passage 47d to the second brake 26 which is then engaged. In this condition the transmission is shifted to the 2nd speed stage.

When the vehicle speed further increases, the 2-3 speed shift valve 57 is shifted to the 57B position. The oil pressure supplied to the port 80 is then transmitted to the port 82, wherefrom the pressure is conducted through the passage 47e and the shuttle valve 47f to the direct clutch 25 which is then engaged. On the other hand, the oil pressure which has been supplied to the brake 26 is now exhausted through the passage 47d, the port 81 and a drain 81a. In this condition, the transmission is shifted to the 3rd speed stage, i.e. direct connection.

When the vehicle speed further increases, the overdrive control valve 58 is also shifted to the 58B position, whereby the oil pressure supplied to the port 84 is now switched from the port 85 to the port 86, wherefrom the pressure is conducted through the passage 43h to the brake 19, while the pressure which has been supplied to the clutch 12 is now exhausted through the passage 43g, the port 85 and a drain port 85a. In this condition, the overdrive means 2 is put in operation and the transmission operates in the overdrive stage.

In the above explanation, for the sake of convenience the changing over of the speed stages has been explained in relation to the increase of the vehicle speed. However, in actual operation, the changing over of the speed stages is effected depending upon the balance of the governor pressure and the throttle pressure oppositely applied to the valve element of the individual speed shift valves and, therefore, the shift point varies not only in accordance with the vehicle speed, but also in accordance with the amount of depression of the accelerator pedal. When the vehicle speed gradually lowers, the overdrive control valve 58, the 2-3 speed shift valve 57, and the 1-2 speed shift valve 56 are successively shifted from 58B to 58A, 57B to 57A, and 56B to 56A, respectively, in the reverse manner, thereby successively establishing lower speed stages.

2 Range

When the manual shift valve 44 is shifted to 2 range, the line pressure appears at the output port 43b as well as at the output port 43c, wherefrom the pressure is conducted through the passages 48a and 48b to the port 72 of the 2-3 speed shift valve 57 and the port 77 of the overdrive control valve, respectively, driving the valve elements 69 and 74 downward to maintain the 2-3 speed shift valve and the overdrive control valve at shift positions 57A and 58A. In this condition, therefore, the overdrive mechanism is maintained in the locked condition and the reduction gear mechanism operates either in the 2nd speed stage or in the 1st speed stage.

L Range

When the manual shift valve 44 is shifted to L range, the line pressure also appears at the output port of 43d, wherefrom the pressure is conducted through the low modulator valve 66 to the ports 64 and 65 of the 1-2 speed shift valve 56, driving the valve element 61 downward in the figure to maintain the 1-2 speed shift valve in the lower shift position 56A. In this condition, the automatic transmission is maintained in the 1st speed stage.

As obvious from the foregoing explanations, if the manual shift valve 44 is abruptly shifted from D range to 2 range when the vehicle is running under the overdrive condition, the overdrive control valve 58 is forcibly shifted from position 58B to position 58A by the line pressure delivered from the port 43c of the manual shift valve and, simultaneously, the 2-3 speed shift valve 57 is also forcibly shifted from position 57B to position 57A by the same line pressure. In this case, therefore, the automatic transmission is abruptly shifted down by two speed stages from the overdrive stage to the 2nd speed stage, skipping over the 3rd speed stage, thereby causing various problems such as explained above.

Figure 3:
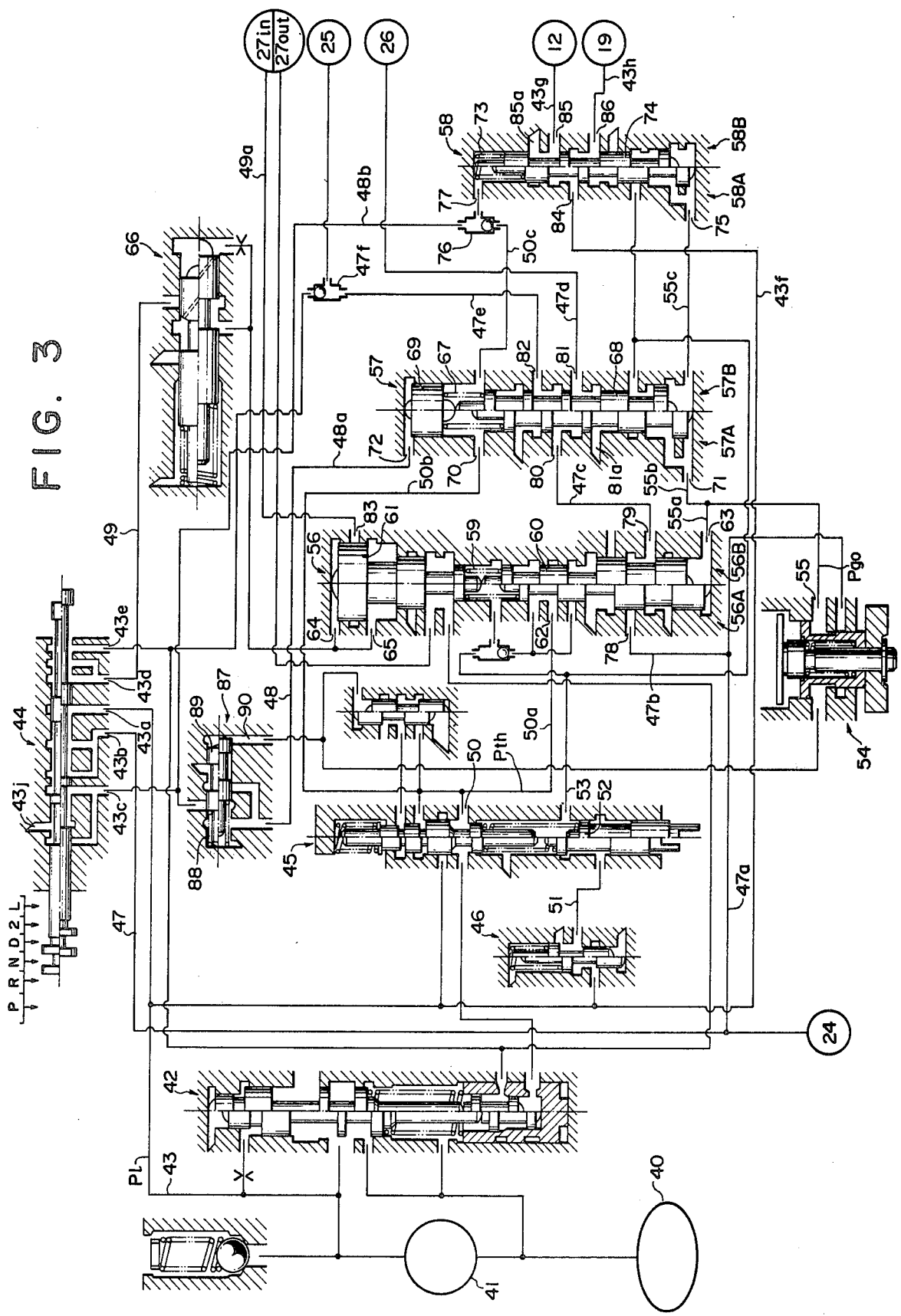
FIG. 3 is a view similar to FIG. 2, showing an oil pressure control means incorporating an embodiment of the present invention.

FIG. 3 is a view similar to FIG. 2 and showing an oil pressure control means improved in accordance with the present invention. In FIG. 3, the portions corresponding to those shown in FIG. 2 are designated by the same reference numerals. In the oil pressure control system shown in FIG. 3, a downwshift control valve 87 is provided at a middle portion of the oil passage 48 which transmits the line pressure from the second speed port 43c of the manual shift valve 44 to the port 72 of the 2-3 speed shift valve 57. The downshift control valve 87 is adapted to be controlled by the governor pressure so as to intercept the passage 48 when the governor pressure is higher than a predetermined value. The downshift control valve 87 comprises a valve element 89 resiliently driven rightward in the figure by a compression coil spring 88, said valve element being adapted to be shifted leftward in the figure when the governor pressure supplied to a port 90 is higher than said predetermined value. By the provision of the downshift control valve, when the vehicle is running in the overdrive stage, the valve element 89 is in the leftward shift position, due to a relatively high governor pressure supplied to the port 90, thereby intercepting the passage 48. Therefore, even if the manual shift valve 44 is abruptly shifted from D range to 2 range, the line pressure delivered from the port 43c of the manual shift valve is supplied only to the overdrive control valve 58 so as to shift it from shift position 58B to shift position 58A while the line pressure is not supplied to the 2-3 speed shift valve 57. Therefore, the automatic transmission is shifted down for a time to the 3rd speed stage. By this downshifting, the vehicle is effected with engine braking and gradually reduces its speed. When the vehicle speed has lowered to a predetermined value, the force of the compression coil spring 88 in the downshift control valve overcomes the force of the governor pressure exerted on the right end of the valve element 89 so that the valve element 89 is shifted rightward in the figure thereby opening the passage 48. Thus, the 2-3 speed shift valve 57 is now shifted down from position 57B to position 57A thereby effecting downshifting from the 3rd speed stage to the 2nd speed stage.

Figure 4:
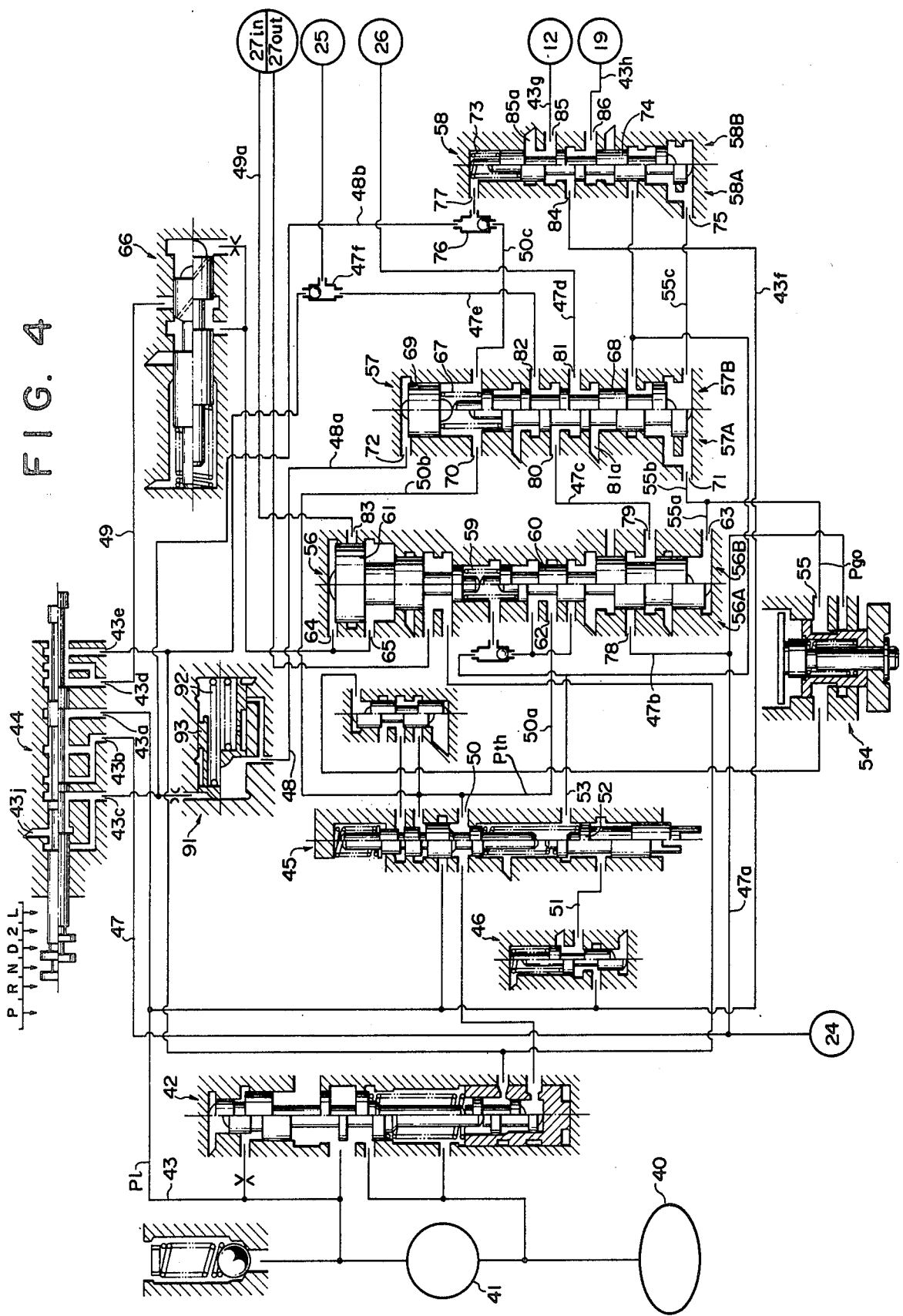
FIG. 4 is a view similar to FIGS. 2 and 3, showing an oil pressure control means incorporating a second embodiment of the present invention.

FIG. 4 is a view similar to FIG. 2 or 3 showing still another embodiment of the present invention. Also in FIG. 4 the portions corresponding to those shown in FIG. 2 or 3 are designated by the same reference numerals. In this embodiment, the downshift control valve 87 adapted to be controlled by the governor pressure in the first embodiment is replaced by a downshift control valve 91 of a timer type. The downshift control valve 91 comprises a valve element 93 urged leftward in the figure by a compression coil spring 92. When the line pressure is not delivered to the port 43c of the manual shift valve, the valve element 93 is in the leftward shift position wherein it intercepts the passage 48. When the line pressure delivered from the port 43c is applied to the left end of the valve element 93, it is driven rightward and after the lapse of a predetermined time it opens a passage connected to the passage 48a. Therefore, it will be appreciated that by the provision of the downshift control valve 91 of a timer type, it is effected stepwise to downshift the automatic transmission first from the overdrive stage to the 3rd speed stage and second from the 3rd speed stage to the 2nd speed stage, even when the manual shift valve 44 has been abruptly shifted from D range to 2 range.

From the foregoing, it will be appreciated that the present invention provides an improved oil pressure control means for automatic transmissions which prevents abrupt downshifting from the overdrive stage to the 2nd speed stage by an incorporation of a very simple downshift control valve in the conventional oil pressure control means, thereby providing great advantages such as ensuring longer life of the friction engaging means, precluding over-revving of the engine and ensuring safety in driving free from any abrupt deceleration caused by downshifting of the manual shift valve during high speed running of the vehicle.

Although the invention has been shown and described with respect to some preferred embodiments thereof, it should be understood by those skilled in the art that various changes and omissions of the form and detail thereof may be made therein without departing from the scope of the invention.

I claim:

1. An oil pressure control means for an automatic transmission which comprises a fluid torque converter and a speed shift gear means having a plurality of friction engaging means and adapted to establish various speed stages, said oil pressure control means comprising a source of oil pressure, a line pressure regulating valve which generates a line pressure from the oil pressure of said source, a throttle pressure regulating valve which generates throttle pressure corresponding to engine throttle opening, a governor valve which generates governor pressure corresponding to vehicle speed, a manual shift valve having a plurality of output ports which selectively deliver output oil pressure for shifting speed ranges, a plurality of speed shift valves which change over supply of oil pressure to said friction engaging means depending upon a balance of said throttle pressure and said governor pressure, first and second passage means for supplying oil pressure delivered from one of said output ports of said manual shift valve to first and second valves of said speed shift valves, respectively, as a control oil pressure for shifting down these valves, said first and second valves causing changing over between the highest speed stage and the next lower speed stage and between said next lower speed stage and the next but one lower speed stage, respectively, and a downshift control valve provided at a middle portion of said second passage means for selectively intercepting the passage therethrough in a manner such that the supply of oil pressure through said second passage is definitely delayed relative to the supply of oil pressure through said first passage so that abrupt two-stage downshifting from the highest speed stage to the next but one lower speed stage is prohibited.

2. An oil pressure control means for an automatic transmission which comprises a fluid torque converter and a speed shift gear means having a plurality of friction engaging means and adapted to establish various speed stages, said oil pressure control means comprising a source of oil pressure, a line pressure regulating valve which generates a line pressure from the oil pressure of said source, a throttle pressure regulating valve which generates throttle pressure corresponding to engine throttle opening, a governor valve which generates governor pressure corresponding to vehicle speed, a manual shift valve having a plurality of output ports which selectively deliver output oil pressure for shifting speed ranges, a plurality of speed shift valves which change over supply of oil pressure to said friction engaging means depending upon a balance of said throttle pressure and said governor pressure, first and second passage means for supplying oil pressure delivered from one of said output ports of said manual shift valve to first and second valves of said speed shift valves, respectively, as a control oil pressure for shifting down these valves, said first and second valves causing changing over between the highest speed stage and the next lower speed stage and between said next lower speed stage and the next but one lower speed stage, respectively, and a downshift control valve provided at a middle portion of said second passage means for selectively intercepting the passage therethrough, said downshift control valve being controlled by said governor pressure so that it intercepts said passage when said governor pressure is higher than a predetermined value.

3. The oil pressure control means of claim 2, wherein said downshift control valve comprises a valve housing having an inlet port connected with said one output port of said manual shift valve by means of an upstream portion of said second passage means, first and second outlet ports connected with each other and a downstream portion of said second passage means, a drain port and a control pressure port constantly supplied with said governor pressure, a valve element received in said bore and having first and second lands, and a spring for biasing said valve element in one direction, said first land controlling communication between said inlet port and said first outlet port on one hand and communication between said second outlet port and said drain port on the other hand in accordance with the pressure level of said governor pressure supplied to said control pressure port.

4. An oil pressure control means for an automatic transmission which comprises a fluid torque converter and a speed shift gear means having a plurality of friction engaging means adapted to establish various speed stages, said oil pressure control means comprising a source of oil pressure, a line pressure regulating valve which generates a line pressure from the oil pressure of said source, a throttle pressure regulating valve which generates throttle pressure corresponding to engine throttle opening, a governor valve which generates governor pressure corresponding to vehicle speed, a manual shift valve having a plurality of output ports which selectively deliver output oil pressure for shifting speed ranges, a plurality of speed shift valves which change over supply of oil pressure to said friction engaging means depending upon a balance of said throttle pressure and said governor pressure, first and second passage means for supplying oil pressure delivered from one of said output ports of said manual shift valve to first and second valves of said speed shift valves, respectively as a control oil pressure for shifting down these valves, said first and second valves causing changing over between the highest speed stage and the next lower speed stage and between said next lower speed stage and the next but one lower speed stage, respectively, and a downshift control valve provided at a middle portion of said second passage means for selectively intercepting the passage therethrough, said downshift control valve being a timer valve which opens said second passage when a predetermined time has lapsed after the oil pressure has been supplied thereto through said second passage.

5. The oil pressure control means of claim 4, wherein said downshift control valve comprises a valve housing having a bore, an inlet port connected with an upstream portion of said second passage means, first and second outlet ports connected with each other and a downstream portion of said second passage means, and a drain port, arranged in said order along the axis of said bore, a valve element received in said bore and having first and second lands, and a spring for biasing said valve element towards said inlet port, said first land controlling communication between said inlet port and said first outlet port so that they are communicated when said valve element moves for a predetermined distance against the force of said spring, said second land controlling communication between said drain port and said second outlet port.

6. The oil pressure control means of claim 1, 2, or 4, wherein said highest speed stage is an overdrive stage and said next lower speed stage is the direct connection stage.

\* \* \* \* \*